(12) United States Patent
Yang

(10) Patent No.: US 7,286,342 B2
(45) Date of Patent: Oct. 23, 2007

(54) DISPLAY USED ON A DESK OR A WALL

(75) Inventor: Christina Yang, Taipei (TW)

(73) Assignee: Inventec Corporation, Shih-Lin District, Taipei (TW)

( * ) Notice: Subject to any disclaimer, the term of this patent is extended or adjusted under 35 U.S.C. 154(b) by 0 days.

(21) Appl. No.: 11/394,428

(22) Filed: Mar. 31, 2006

(65) Prior Publication Data

US 2007/0121280 A1    May 31, 2007

(30) Foreign Application Priority Data

Nov. 25, 2005   (TW) .............................. 94220455 U

(51) Int. Cl.
*G06F 1/16*    (2006.01)
(52) U.S. Cl. ...................................... 361/681; 248/917
(58) Field of Classification Search ........ 361/679–683; 248/917–924
See application file for complete search history.

(56) References Cited

U.S. PATENT DOCUMENTS

| | | | |
|---|---|---|---|
| 6,954,221 B2* | 10/2005 | Wu ............................ | 361/681 |
| 2004/0008476 A1* | 1/2004 | Cheng ........................ | 361/681 |
| 2004/0012917 A1* | 1/2004 | Jung et al. .................. | 361/681 |
| 2005/0157457 A1* | 7/2005 | Kim ........................... | 361/681 |
| 2005/0254204 A1* | 11/2005 | Hwang et al. .............. | 361/681 |

\* cited by examiner

*Primary Examiner*—Jayprakash Gandhi
*Assistant Examiner*—Anthony Q Edwards
(74) *Attorney, Agent, or Firm*—Fulbright & Jaworski

(57) ABSTRACT

A display used on a desk or a wall, includes a display; a center seat pivoted to a rear side of the display; and a base pivoted to the center seat. The base can be rotated to a lower portion of the display, serving as a pedestal to support the display on the desk, or be rotated to a rear side of the display, allowing the base to be mounted on the wall via a through hole formed in a bottom of the base so as to hang the display on the wall.

5 Claims, 7 Drawing Sheets

DISPLAY USED ON A DESK OR A WALL

FIELD OF THE INVENTION

The present invention relates to a display used on a desk or a wall, and more specifically, to a display whose base can be rotated to a lower portion or a rear side so that the display can be placed on a desk or mounted on a wall.

BACKGROUND OF THE INVENTION

Conventional displays used in computers are cathode ray tube (CRT) displays. After that, liquid crystal displays (LCD) are introduced, which gradually evolve from small, black and white displays to color displays having large screens. Additionally, LCD has a small and thin volume so that it can be arranged on various environments. Therefore, LCD almost replaces conventional CRT display in the market.

Besides used as a monitor of a computer or other electronic devices, the LCD can also used as a TV set at home. Additionally, the LCD has a small and thin volume and a light weight, so that it can be placed on a desk via a simple pedestal. The overall volume of an LCD is greatly reduced compared to that of a CRT display, particularly to those displays having large screens.

Furthermore, because of the small and thin volume, besides placed on a desk via a pedestal, a suspension rack can be arranged on the LCD to suspend the LCD on a wall; usable space on the desk is thus enlarged without being taken up. In the case of the LCD used as a common TV set at home, a lot of usable space is thus saved without being taken up.

The pedestal of the conventional desktop LCD is stationary, which can not be detached from the main body of the display so that the display can be suspended to the wall without the pedestal. In addition, there is no corresponding structure for the suspension of the LCD, that is, a desktop type LCD has no suspension structure thereon. Therefore, once a desktop type LCD is selected, generally it can not be transformed into a suspension type LCD, which is inconvenient for a consumer's selection. However, because the suspension type LCD does not employ the pedestal, which has a smaller and thinner volume and takes up less space, and therefore which gradually changes the using habit of the consumers.

Structures, such as detachable movable pedestal, may also be provided on a suspension type LCD for placing the LCD on a horizontal plane. If the LCD is selected to be a suspension type LCD, the movable pedestal can be detached, and therefore the LCD can be directly suspended on the wall. If the LCD is alternatively selected to be placed on a horizontal plane, such as on a desk or the ground, the movable pedestal can be arranged on a lower portion of the LCD, and therefore the LCD can be erectly placed on the desk or the ground. However, the movable pedestal is a detachable structure, which has to be detached when the LCD is selected to be a suspension type LCD. The detached pedestal has to be safely preserved, otherwise inconvenience will be led to in the case of the pedestal is lost or damaged. Furthermore, it generally will be a long time when a change is made, it is inconvenient to find out the movable pedestal, which may have been discarded when it is not in use. Thus, it is inconvenient in practical use.

Consequently, how to provide a display which can be placed on a horizontal plane and a desk without assembling and detaching the movable pedestal, and without the problem of reservation of the detached movable pedestal, has become a task to be accomplished.

SUMMARY OF THE INVENTION

In light of the above prior-art drawbacks, an objective of the present invention is to provide a display used on a desk or a wall, wherein the display can be placed on a horizontal plane or suspended on a wall.

In accordance with the above and other objectives, the present invention proposes a display used on a desk or a wall, comprising: a display; a center seat pivoted to a rear side of the display; and a base pivoted to the center seat, such that when the base is rotated to a lower portion or a rear side of the display, the display can be placed on a horizontal plane or mounted on a wall.

Further, a short axis is arranged on the rear side of the display, wherein an end of the short axis is formed with a transversely arranged pin hole. The center seat is a frame structure comprising a first through hole. The short axis of the display is passed through the first through hole of the center seat, wherein a locking ring is arranged on the short axis, and a pin is passed through the pin hole of the short axis, for pivoting the center seat to the short axis of the display, for pivoting the center seat to the rear side of the display.

The base comprises a projecting portion, wherein the projecting portion of the base comprises a recess. The center sear may further comprise a second through hole, allowing a shaft to be passed through the transversal hole and the second through hole of the center seat, for pivoting the center seat to the recess of the projecting portion of the base.

The base is pivoted to the center seat, and the center seat is pivoted to the rear side of the display, such that the base may be freely rotated to a lower portion of the display and serving as the pedestal of the display, allowing the display to be placed on the desk.

Furthermore, the base may comprise at least a through hole in a bottom thereof, such that the base can be rotated to a rear side of the display and serving as the suspension rack, allowing the display to be mounted on the wall via the through hole in a rear side of the base so as to form a suspension-type display.

In conclusion, the display used on a desk or a wall of the present invention, has a base pivoted the center seat, and a center seat pivoted to a short axis arranged on a rear side of the display, such that the base can be freely rotated to the lower portion of the display to server as a pedestal for the display, or be rotated to the rear side of the display to server as a suspension rack for the display. Therefore the display may become a desktop-type display or a suspension type display, as it can be selectively placed in various manners according to various environments or requirements.

DETAILED DESCRIPTION OF THE PREFERRED EMBODIMENTS

The following embodiments are used to describe the present invention; those skilled in the art can easily understand other advantages and functions of the present invention via the contents disclosed in the description. Various embodiments can be employed in the present invention; and the detail of the description can be based on and employed in various points of view, which can be modified within the scope of the present invention.

Figure 1:
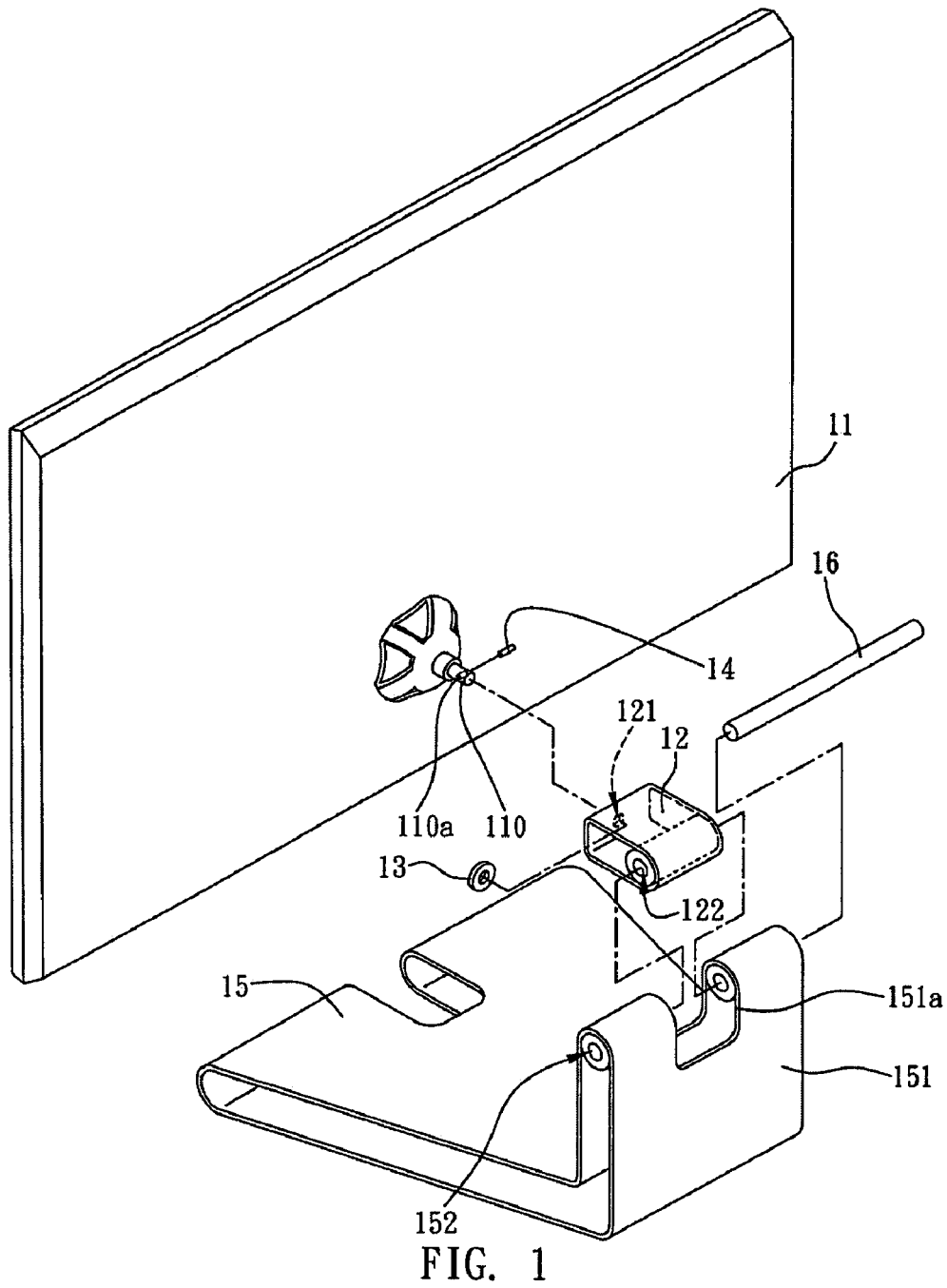
FIG. 1 is an isometric, exploded view of a display used on a desk a wall in accordance with the present invention.
Figure 2:
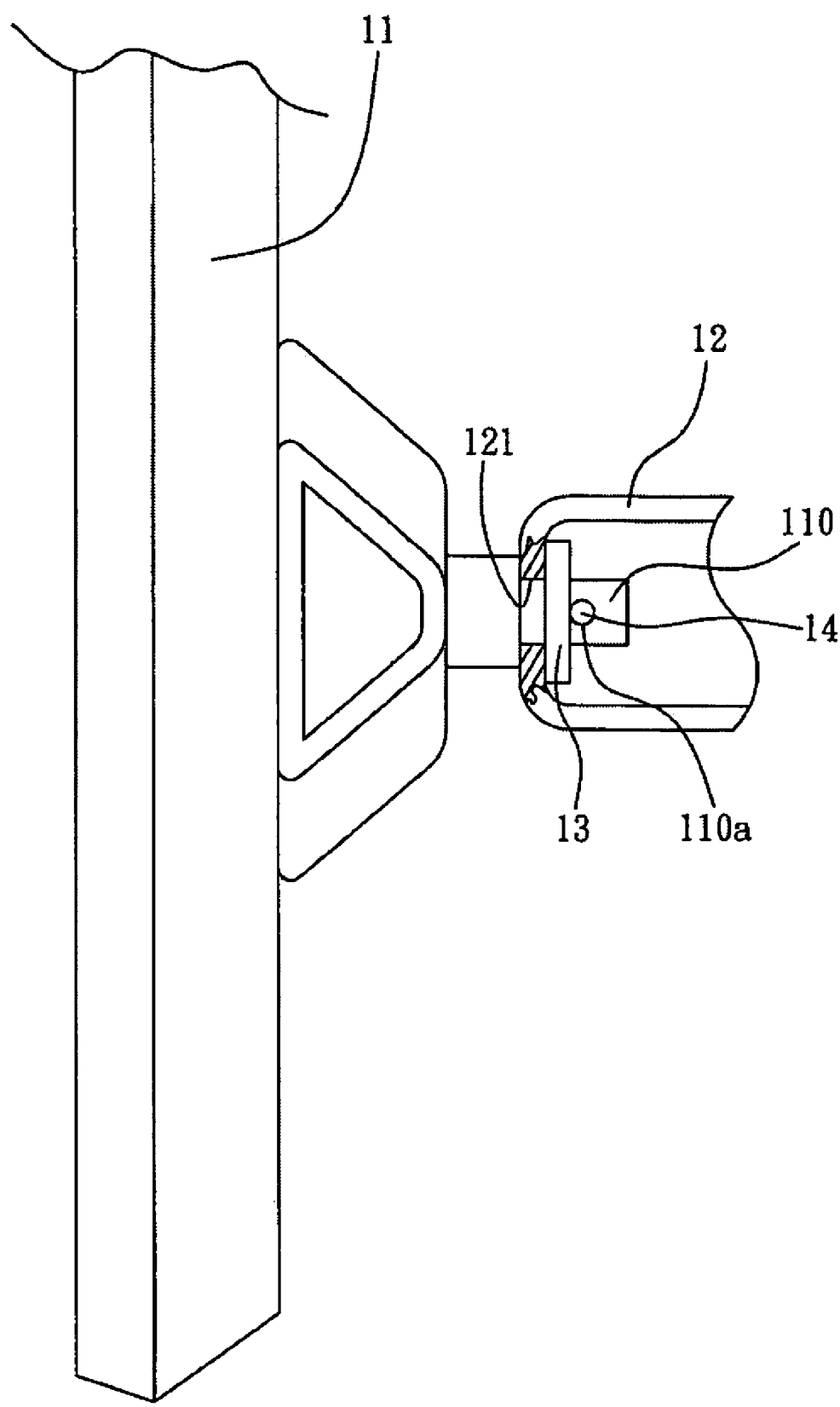
FIG. 2 is a schematic, partial side view of the display used on a desk a wall in accordance with the present invention.

Referring to FIG. 1, in the display used on a desk a wall of the present invention, a short axis 110 is arranged on a rear side of a display 11, such as an LCD. The short axis 110 defines a transversal pin hole 110a. The short axis 110 pivots a center seat 12. The center seat 12 is a frame structure, an end thereof defines a first through hole 121, so that the short axis 110 passes through the first through hole 121 of the center seat 12. A locking ring 13 is arranged on an endmost portion of the short axis 110, and is abutted against an inner side of the first through hole 121 of the center seat 12, so that the center seat 12 is pivoted to the short axis 110 of the display 11, as shown in FIG. 2.

The center seat 12 pivots a base 15. The base 15 comprises a projecting portion 151. The projecting portion comprises a recess 151a. In addition the base 15 defines a transversal through hole 152. And the center seat 12 further comprises a second through hole 122. The center seat 12 is arranged in the recess 151a of the projecting portion 151 of the base 15. A shaft 16 is passed through the transversal through hole 152, and further passed through the second through hole 122 of the center seat 12, so that the center seat 12 can be pivoted in the recess 151a of the projecting portion 151 of the base 15.

The base 15 is pivoted to the center seat 12, and the center seat 12 is pivoted to the short axis 110 of the rear side of the display 11, so that the base 15 can be upwardly or downwardly rotated to be arranged on a lower portion or a rear side of the display 11 via the center seat 12. The display 11 is pivoted to the center seat 12 via the short axis 110 arranged on the rear side thereof which can be rotated to adjust the display in cooperation of the base 15.

Figure 3A:
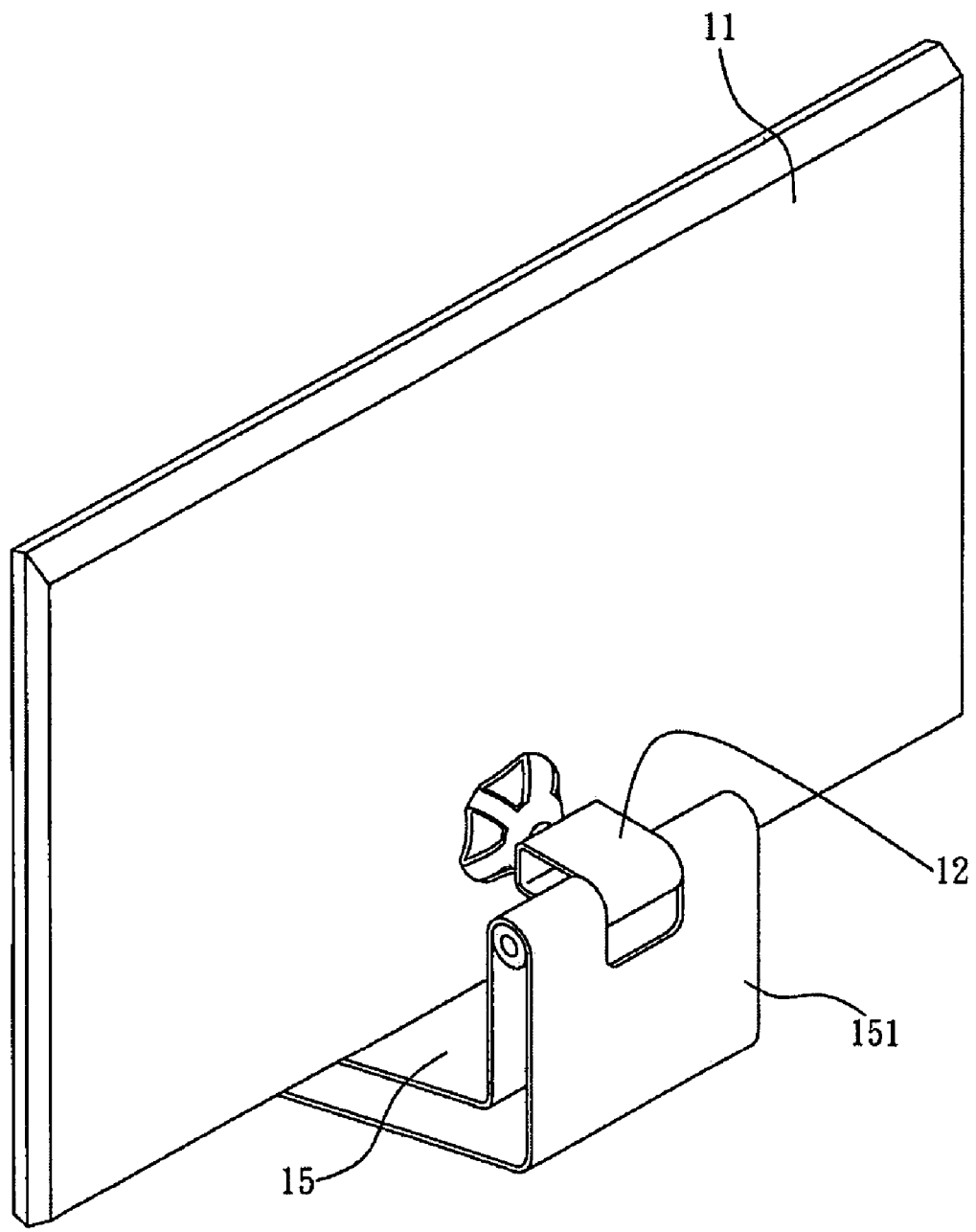
FIGS. 3A and 3B are a schematic, isometric view, and a schematic side view of the display used on a desk a wall in accordance with the present invention, showing the display is reformed into a desktop type display.
Figure 3B:
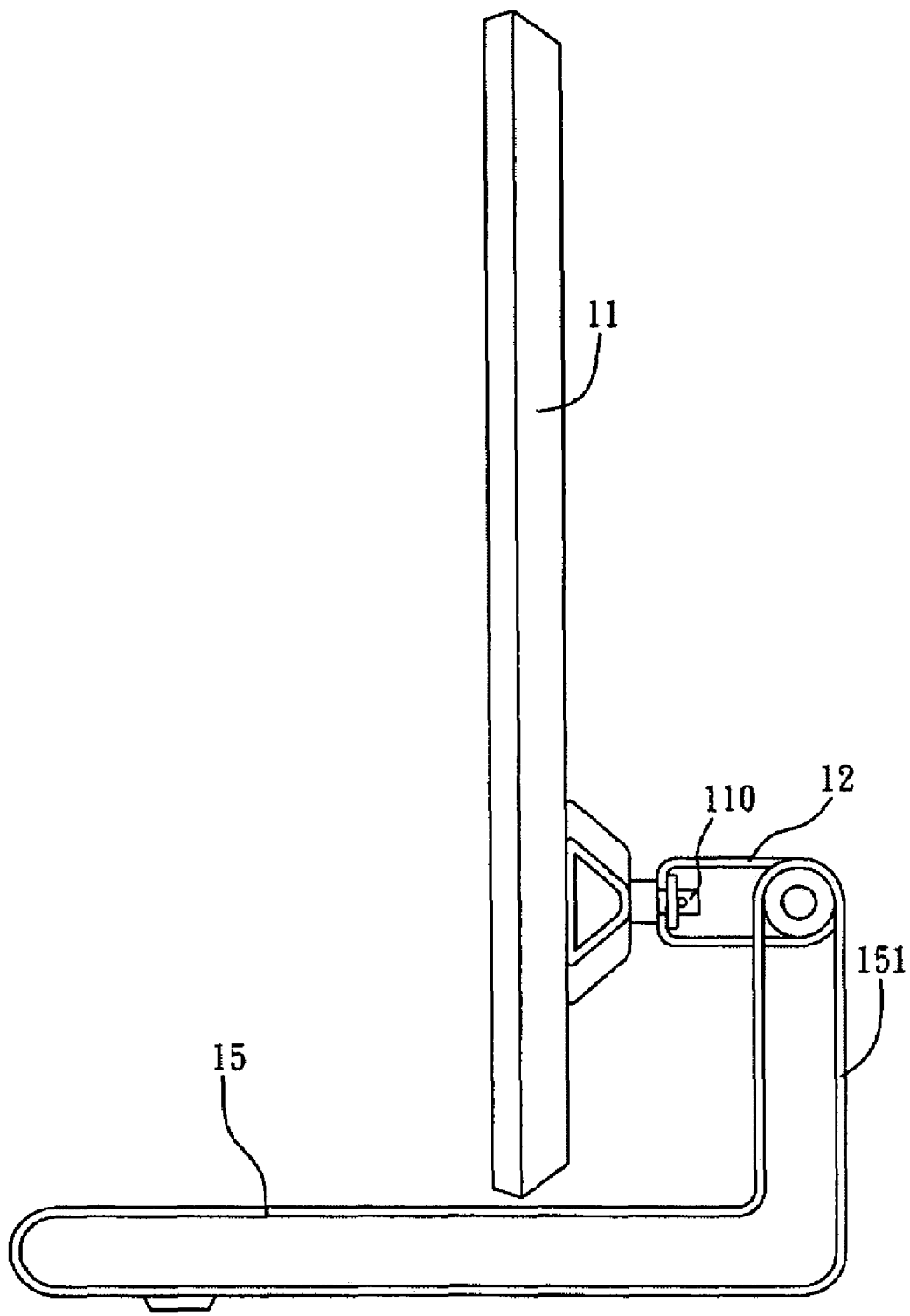

Referring to FIG. 3A and FIG. 3B, the base 15 is rotated to the lower portion of the display 11, thus the base 15 serves as a pedestal of the display 11, so that the display 11 can be erectly placed on the desk to be a desktop type display.

Figure 4A:
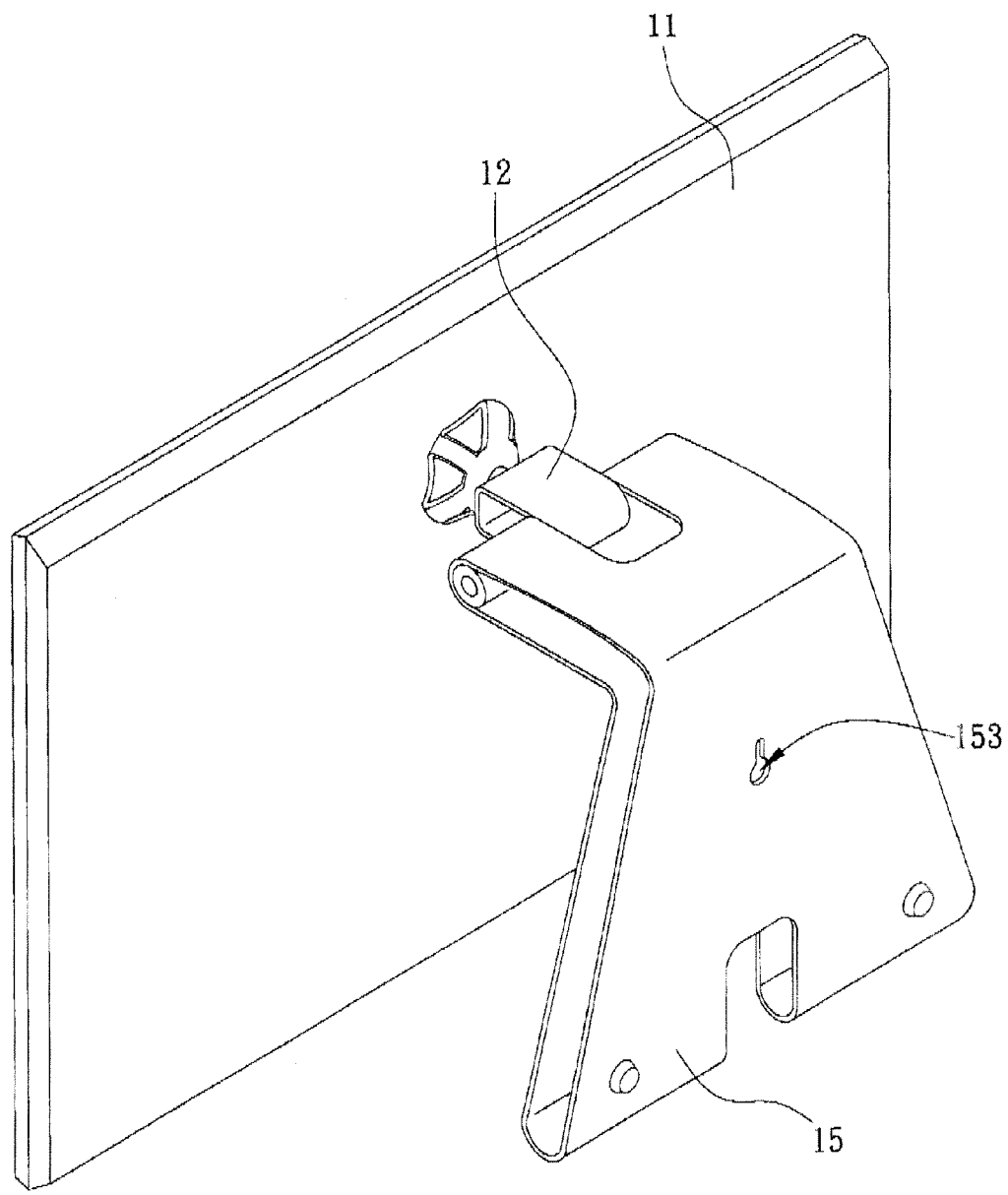
FIGS. 4A and 4B are a schematic, isometric view, and a schematic side view of the display used on a desk a wall in accordance with the present invention, showing the display is reformed into a suspension type display.
Figure 4B:
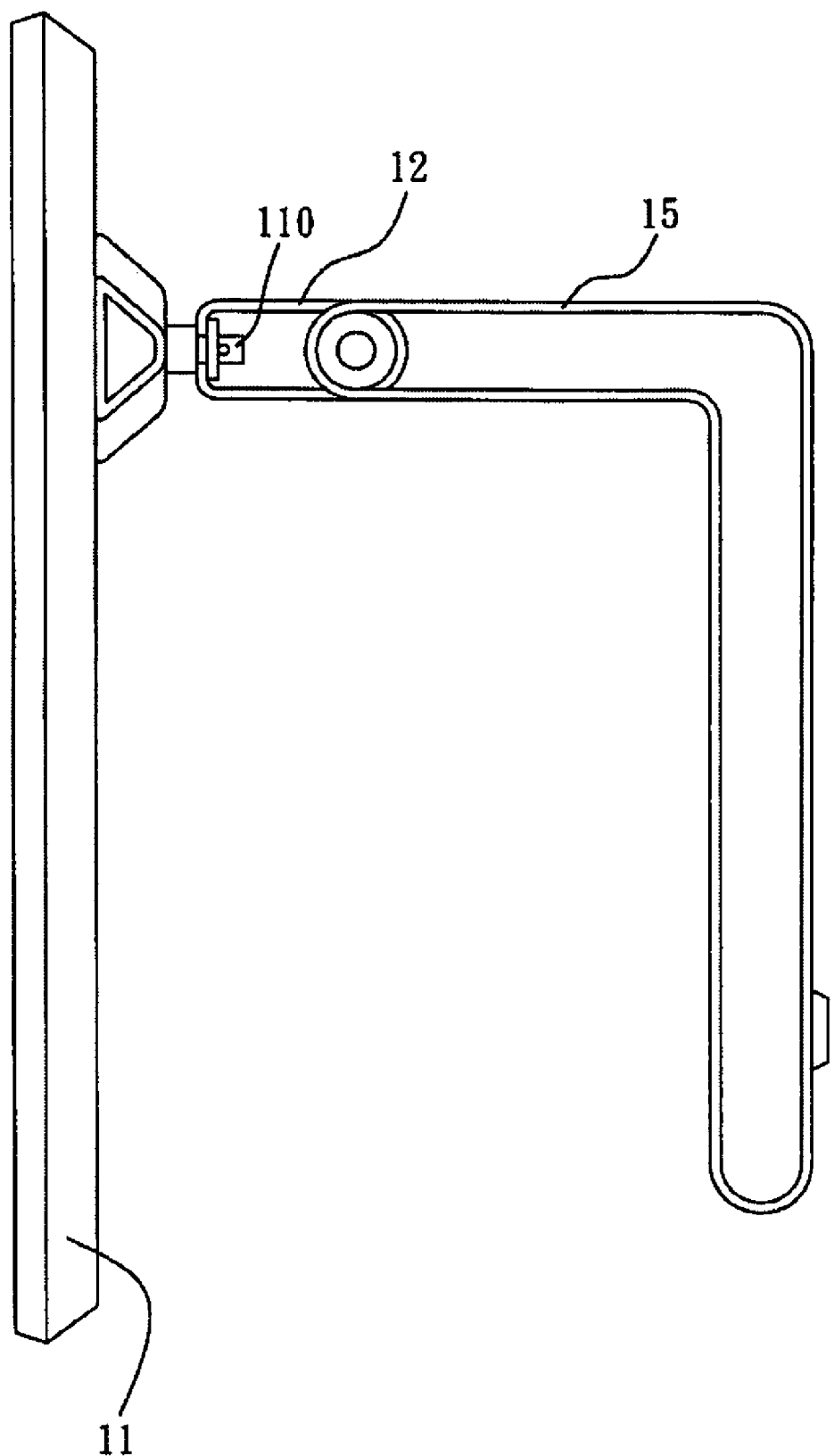
Figure 5:
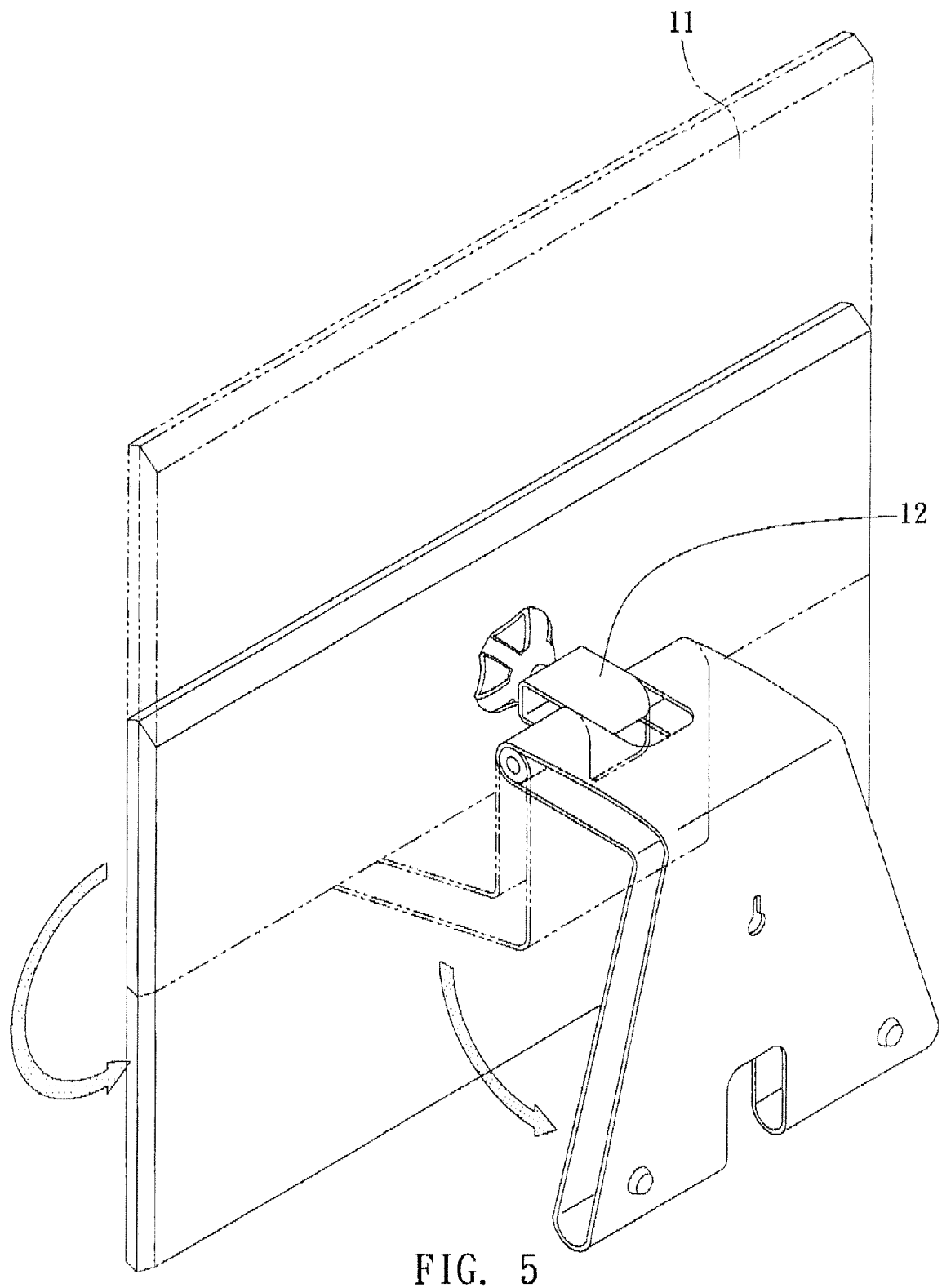
FIG. 5 is a schematic, isometric view of the display used on a desk a wall in accordance with the present invention, showing the display is reformed from a desktop type display into a suspension type display.

Referring to FIGS. 4A and 4B, the base 15 is rotated to the rear side of the display 11, thus the base 15 serves as the suspension rack of the display 11. The base 15 defines a through hole 153 in a bottom thereof, so that it can be suspended on the wall via the through hole 153. When the base 15 is rotated to the rear side of the display 11, the display 11 is downwardly rotated, as shown in FIG. 5, to be a suspension type display to be suspended on the wall.

In conclusion, in the display used on a desk a wall of the present invention, the base pivots the center seat, and the center seat pivots the short axis arranged on the rear side of the display, so that the base can be freely rotated to the lower portion of the display to server as the pedestal of the display, or be rotated to the rear side of the display to be the suspension rack of the display, the display therefore become a desktop type or a suspension type display which can be selected to be placed in various style according to various environments or requirements.

It should be apparent to those skilled in the art that the above description is only illustrative of specific embodiments and examples of the present invention. The present invention should therefore cover various modifications and variations made to the herein-described structure and operations of the present invention, provided they fall within the scope of the present invention as defined in the following appended claims.

What is claimed is:

1. A display used on a desk or a wall, comprising:
    a display;
    a center seat pivoted to a rear side of the display, wherein a short axis is formed on the rear side of the display for pivoting the center seat via the short axis, wherein the center seat comprises a first through hole, such that the short axis of the display is passed through the first through hole and connected to the center seat, for pivoting the center seat to the rear side of the display, and wherein the center seat is a frame structure having an end thereof formed with the first through hole, and the short axis of the display comprises a transversely arranged pin hole, such that the short axis passed through the first through hole of the center seat is coupled with a locking ring and further having a pin passing through the pin hole of the short axis, for pivoting the center seat to the short axis of the display;
    a base pivoted to the center seat, such that the base is rotated to a lower portion or a rear side of the display so as to allow the display to be placed on a horizontal plane or mounted to a wall, the base comprising a projection portion comprising a recess pivoted to the center seat; and
    a shaft passed through the projecting portion of the base and the center seat, for pivoting the center seat to the recess of the projecting portion of the base.

2. The display used on a desk or a wall as claimed in claim 1, wherein a bottom of the base is formed with at least a through hole.

3. The display used on a desk or a wall as claimed in claim 1, wherein the center seat further comprises a second through hole, so that the shaft is passed through the center seat via the second through hole.

4. The display used on a desk or a wall as claimed in claim 3, wherein the base comprises a transversal hole, such that the shaft is passed through the transversal hole and the second through hole of the center seat.

5. The display used on a desk or a wall as claimed in claim 1, wherein the display is an LCD.

* * * * *